(12) United States Patent
Bunch et al.

(10) Patent No.: US 8,599,064 B2
(45) Date of Patent: Dec. 3, 2013

(54) SYSTEMS AND METHODS FOR RADAR DATA COMMUNICATION

(75) Inventors: Brian Bunch, Snohomish, WA (US); Roland Szeto, Seattle, WA (US); Brad Miller, Kent, WA (US)

(73) Assignee: Honeywell International Inc., Morristown, NJ (US)

( * ) Notice: Subject to any disclaimer, the term of this patent is extended or adjusted under 35 U.S.C. 154(b) by 1281 days.

(21) Appl. No.: 12/040,706

(22) Filed: Feb. 29, 2008

(65) Prior Publication Data

US 2009/0219196 A1 Sep. 3, 2009

(51) Int. Cl.
*G01S 7/04* (2006.01)

(52) U.S. Cl.
USPC ......................................................... 342/176

(58) Field of Classification Search
USPC ........................................................ 342/26 B
See application file for complete search history.

(56) References Cited

U.S. PATENT DOCUMENTS

| | | | | |
|---|---|---|---|---|
| 4,520,506 A * | 5/1985 | Chan et al. | ...... | 382/242 |
| 5,265,024 A * | 11/1993 | Crabill et al. | ...... | 701/200 |
| 5,923,285 A | 7/1999 | Andrusiak et al. | | |
| 6,199,008 B1 | 3/2001 | Aratow et al. | | |
| 6,501,392 B2 * | 12/2002 | Gremmert et al. | ...... | 340/971 |
| 6,633,801 B1 | 10/2003 | Durlacher et al. | | |
| 6,650,972 B1 | 11/2003 | Robinson et al. | | |
| 6,828,922 B1 * | 12/2004 | Gremmert et al. | ...... | 340/949 |
| 7,352,317 B1 * | 4/2008 | Finley et al. | ...... | 342/26 B |
| 2002/0039070 A1 | 4/2002 | Ververs et al. | | |
| 2002/0039072 A1 | 4/2002 | Gremmert et al. | | |
| 2003/0210183 A1 | 11/2003 | Andrusiak et al. | | |
| 2004/0030824 A1 * | 2/2004 | Krauss | ...... | 711/103 |
| 2004/0183695 A1 | 9/2004 | Ruokangas et al. | | |
| 2006/0129286 A1 | 6/2006 | King | | |
| 2007/0060362 A1 * | 3/2007 | Osgood et al. | ...... | 463/42 |
| 2008/0018659 A1 * | 1/2008 | Aspen | ...... | 345/592 |
| 2008/0022217 A1 * | 1/2008 | Aspen | ...... | 715/764 |
| 2008/0094255 A1 * | 4/2008 | Bethel | ...... | 340/971 |
| 2009/0132748 A1 * | 5/2009 | Sheffield | ...... | 710/307 |

FOREIGN PATENT DOCUMENTS

GB 2304016 A * 3/1997

OTHER PUBLICATIONS

"Aviation Weather." Feb. 2, 2007. AnywhereMap. Jul. 9, 2009. <http://web.archive.org/web/20070202054903/http://www.anywheremap.com/aviation-weather.aspx>.*
Jensen, David. "Weather in the Cockpit." Avionics Magazine. Jun. 1, 2000. Jul. 9, 2009 <http://www.aviationtoday.com/av/categories/atc/Weather-in-the-Cockpit_12704.html>.*
Yeh et al. Electronic Flight Bag (EFB): 2007 Industry Review. U.S. Department of Transportation. Apr. 2007. pp. 1-49.*

(Continued)

*Primary Examiner* — Matthew M Barker
(74) *Attorney, Agent, or Firm* — Shumaker & Sieffert, P.A.

(57) ABSTRACT

A radar information processing system is operable to process high bandwidth radar information received from a radar system into low bandwidth radar information that may be communicated to a low bandwidth connection coupled to an electronic flight bag (EFB). An exemplary embodiment receives radar information from a radar system, the radar information communicated from the radar system at a first bandwidth; processes the received radar information into processed radar information, the processed radar information configured for communication over a connection operable at a second bandwidth, the second bandwidth lower than the first bandwidth; and communicates the radar information from a radar system, the radar information communicated from the radar system at a first bandwidth.

19 Claims, 4 Drawing Sheets

(56) References Cited

OTHER PUBLICATIONS

Velotas et al., Turbulence Auto-PIREP System (TAPS) An Overview, AeroTech Research (U.S.A.), Inc., Jun. 9, 2005.
Robinson et al., Using Airborne Turbulence Detection & Reporting Technologies to Increase Airspace Utilization, The Application of Aviation Safety Technologies to Airspace Management, AeroTech Research (U.S.A.), Inc., Jul. 2005.
Turbulence Auto-PIREP System (TAPS), AeroTech Research (U.S.A.), Inc., 2008.
European Patent Office; Communication from the European Patent Office, Netherlands, EPO Form 1507N 08.10; European Search Report dated May 6, 2011; 6 pages.

\* cited by examiner

| | Preamble | 1 | 2 | 3 | 4 | | 20 | | 511 | 512 |
|---|---|---|---|---|---|---|---|---|---|---|
| $i$ | $P_i$ | 1 | 2 | 3 | 4 | ... | 20 | ... | 511 | 512 |
| $i+1$ | $P_{i+1}$ | 1 | 2 | 3 | 4 | ... | 20 | ... | 511 | 512 |

502

| | | $a$ | $b$ | | $c$ |
|---|---|---|---|---|---|
| $i$ | $P_i$ | A | B | ... | C |
| $i+1$ | $P_{i+1}$ | A | B | ... | C |

602

SYSTEMS AND METHODS FOR RADAR DATA COMMUNICATION

GOVERNMENT RIGHTS

The invention described herein was made in the performance of work under NASA Contract No. NNL06AA22C (Subcontract No. 07-002) and is subject to the provisions of Section 305 of the National Aeronautics and Space Act of 1958 (42 U.S.C. 2457). The Government may have rights to portions of this invention.

BACKGROUND OF THE INVENTION

Aeronautical Radio, Incorporated (ARINC) standards define parameters for communications between aeronautical devices and systems. The standards support the physical and communication interfaces for transfer of digital information. Radio detection and ranging (RADAR, or commonly referred to as "radar") systems typically output information that conforms to the ARINC 453 standard, which is a high-speed data protocol for weather radar. The ARINC 453 standard communicates radar information using a 1600 bit word communicated at 1000 kHz.

A radar system emits a directional radio signal along a relatively narrow beam. The radar system then detects returning radio signals reflected by weather phenomena and/or other physical objects. Analysis of the returning radar signals along the particular direction (radial) of the returning radio signal (corresponding to the direction of the emitted radio signal) allows determination of characteristics of the reflecting weather phenomena (and/or other physical objects). For example, the distance range of weather phenomena and/or other physical objects from the radar system may be determined. For certain types of weather phenomena, the intensity of the weather phenomena at various ranges is determinable. For example, the radar system is capable of discerning between light cloud cover versus a heavy thunderstorm having lightning and hail.

As the radar system rotates (sweeps) the position of the radio signal emitter back and forth (or in a circle), the returning radar signals may be analyzed to construct an image of the weather in front of (or around) the aircraft. That is, image data for a plurality of adjacent radials is assembled to form information corresponding to the weather phenomena in front of (or around) the aircraft. The information is presented on a radar display.

The radar information for a radial is presented in a single ARINC 453 word. The 1600 bit ARINC 453 word begins with a 64 bit header followed by a series of 512 sub-words (3 bits each). The header specifies orientation of the radial. The relative location of each sub-word in the word corresponds to a range of a radial. The sub-words contain color information, which is indicative of the nature (e.g., severity) of the detected weather phenomena and/or other physical objects. For example, the color black indicates an absence of weather phenomena (no returning reflected radar signal at that range).

Aircraft personnel may use various types of portable auxiliary equipment. Such equipment may be commonly referred to as an "electronic flight bag" (EFB) or an "electronic travel bag" (ETB), generally referred to as EFBs herein. EFBs are connectable to aviation electronics of the airplane via ports, busses, or other suitable connectors. EFBs conform their connections to communicate under the ARINC 429 standard, which is a relatively low speed data protocol (particularly with respect to the ARINC 453 standard used by radars). ARINC 429 supports a low speed data transfer mode (12.5 to 14.5 kHz) or a high speed data transfer mode (100 kHz) based upon a 32 bit word structure.

EFBs may include a display. At times, it may be desirable to have the EFB display present radar information. However, weather radar information available under the ARINC 453 standard (1600 bit words communicated at 1000 kHz) cannot be communicated over a connector operating under the ARINC 429 standard with sufficient speed to present radar information on a real time basis. That is, the inherent delay in communicating the weather radar information (generated in 1600 bit words at a 1000 kHz rate) over the ARINC 429 connector (32 bit words communicated at the low speed or the high speed ARINC 429 rates) would be so great that the presented radar weather image on the EFB display would not be of any useful value to aircraft personnel.

SUMMARY OF THE INVENTION

Systems and methods of communicating radar information over a low bandwidth communication connection are disclosed. An exemplary embodiment has a radar data compression (RDC) unit coupled to a radar system and a connector coupled to the RDC unit. The RDC unit is operable to receive radar information from the radar system, and operable to process the received radar information into processed radar information corresponding to a low bandwidth. The connector is operable to communicate the processed radar information at the low bandwidth to an electronic flight bag (EFB).

In accordance with further aspects, an exemplary embodiment receives radar information from a radar system, the radar information communicated from the radar system at a first bandwidth; processes the received radar information into processed radar information, the processed radar information configured for communication over a connection operable at a second bandwidth, the second bandwidth lower than the first bandwidth; and communicates the processed radar information at the second bandwidth over the connection to an electronic flight bag (EFB) for presentation on a display.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
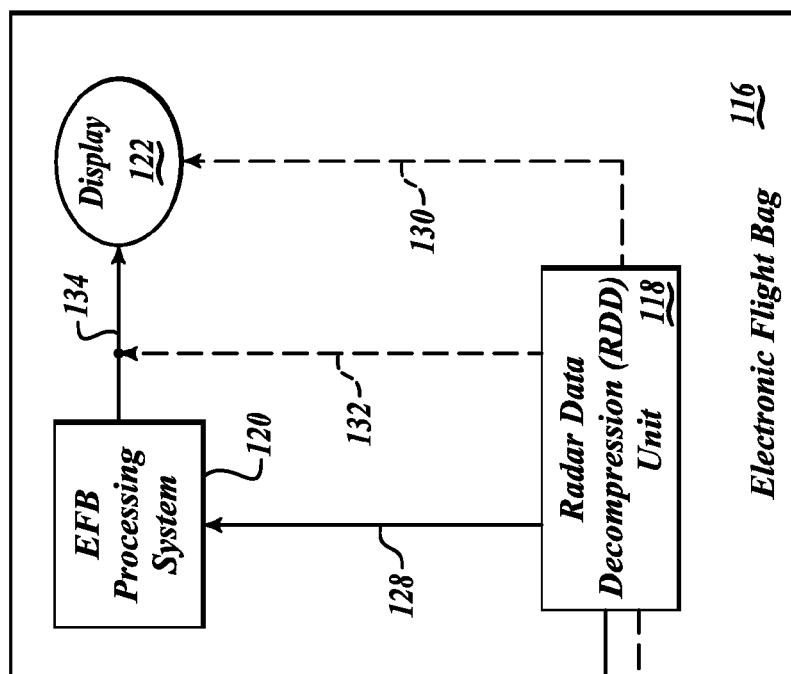
FIG. 1 is a block diagram of an embodiment of the radar information communication system.
Figure 1:
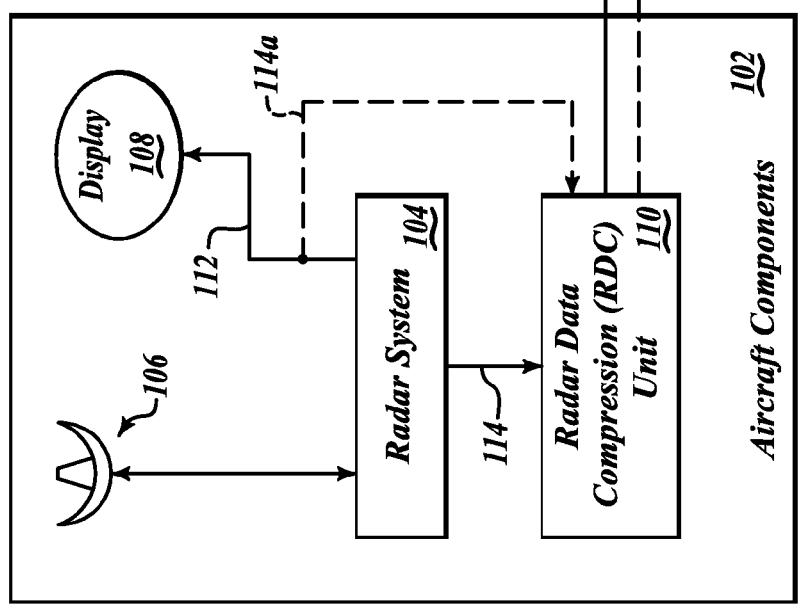

FIG. 1 is a block diagram of an embodiment of the radar information presentation system 100. An exemplary embodiment of the radar information presentation system 100 receives radar information configured under the ARINC 453 format, processes the radar information to a low bandwidth data format, communicates the processed radar information to an electronic flight bag (EFB) 116 or the like, and then, if necessary, reconverts the processed radar information for presentation on a display 122. The display 122 may be part of, or coupled to, the EFB 116. In an exemplary embodiment, the radar information is converted to the ARINC 429 format for communication to the EFB 116. Other embodiments convert the radar information into other formats, such as the Electronics Industry Association (EIA) recommended standards (RS), such as, but not limited to, RS485, RS422, RS232, and RS423. Other standard data transfer protocols may also be used.

Various electronic components reside in an aircraft (not shown), generally denoted as the aircraft components 102. One of such aircraft components is the radar system 104. The radar system 104 emits and receives radio signals via one or more antennas 106. The returned radio signals, reflected from weather phenomena (and/or other physical objects), are processed by radar system 104 so that a radar image signal is generated. The radar image signal, generated in the ARINC 453 format, is communicated to a display 108, via a connection 112. The radar image is then displayed on the display 108. The radar system 104 may be configured to communicate information under the ARINC 453 format or another data intensive format.

A radar data compression (RDC) unit 110 receives radar information from the radar system 104, via a connector 114. Alternatively, the radar information may be received via a connection 114a, which is coupled to the connection 112. The RDC unit 110 compresses the received radar information into a low bandwidth format suitable for communication via a connector 124. In one embodiment, the RDC unit 110 processes the radar information received under the ARINC 453 format into the ARINC 429 format.

The EFB 116 includes, in this exemplary embodiment, a radar data decompression (RDD) unit 118, an EFB processing system 120, and a display 122. In alternative embodiments, the RDD unit 118 and/or the display 122 may reside separately from the EFB 116. The EFB 116 may be a Class 1, Class 2, Class 3, or other designated class of electronic device. Such classes are designated and approved by the Federal Aviation Administration (FAA).

The RDD unit 118 is communicatively coupled to the RDC unit 110 via the connector 124, which is a low bandwidth connector. In one embodiment, the connector 124 is operable to communicate information under the ARINC 429 format. In alternative embodiments, the RDD unit 118 is communicatively coupled to the RDC unit 110 via one or more additional connectors 126, which are also low bandwidth connectors.

The optional RDD unit 118 may decompress the radar information received from the RDC unit 110 into a format used by the EFB processing system 120. The radar information processed by the RDD unit 118 is communicated to the EFB processing system 120, via the connector 128. The EFB processing system 120 may further process the received radar information into a format that is receivable by the display 122. Thus, a radar signal generated by the radar system 104 is generated and is communicated to the display 122 for presentation.

As used herein, the term "compress" refers to any suitable processing whereby an amount of radar information is reduced. Similarly, "decompression", as used herein, refers to any suitable processing whereby the previously "compressed" radar information is further processed. The radar information may be "decompressed" into its original amount or form, or may be processed into another amount or form. Further, the terms "compressed" and "decompressed" may be interchangeably referred to as "processed" herein.

In an alternative embodiment, the RDD unit 118 processes the radar information received from the RDC unit 110 into a format receivable by the display 122. The processed radar information is communicated to the EFB processing system 120 via the connector 128. Thus, the RDD unit 118 further processes the received radar information and communicates the processed radar information directly to the display 122 for presentation.

In some embodiments, the RDD unit 118 processes the radar information into a signal that is in a data presentation format used by the display 122. For example, the RDD unit 118 may generate rasterized line data or digitalized pixel data that is used by the display 122. Accordingly, the RDD unit 118 may be directly coupled to the display 122 via the connector 130.

Figure 2:
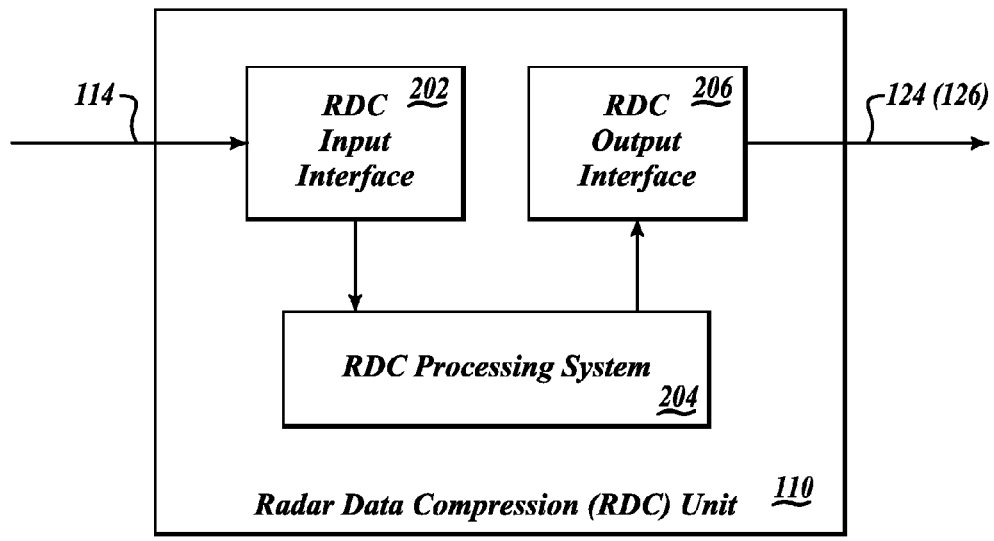
FIG. 2 is a block diagram of an embodiment of the radar information compression unit.

FIG. 2 is a block diagram of an embodiment of the RDC unit 110. The RDC unit 110 comprises an RDC input interface 202, an RDC processing system 204, and an RDC output interface 206. In a preferred embodiment, the RDC input interface 202 is a bus or the like configured to receive radar information from the radar system 104 in the ARINC 453 format. The RDC input interface 202 may receive the radar information in other formats. The RDC processing system 204 processes the received radar information into a low bandwidth format using processes described in greater detail hereinbelow. The low bandwidth radar information is communicated by the RDC output interface 206 onto connection 124 (and connections 126 if used).

Figure 3:
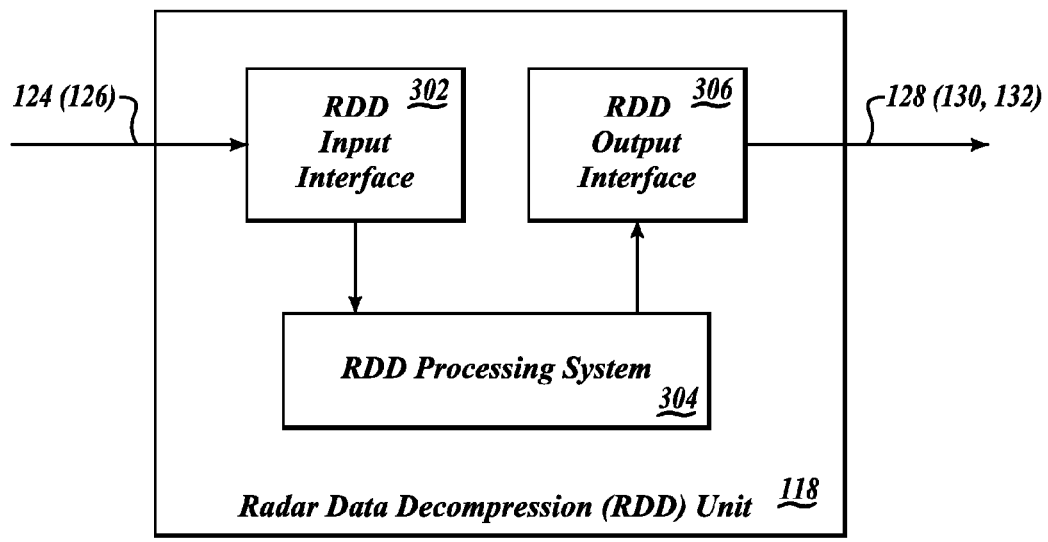
FIG. 3 is a block diagram of an embodiment of the radar information decompression unit.

FIG. 3 is a block diagram of an embodiment of the RDD unit 118. The RDD unit 118 comprises an RDD input interface 302, an RDD processing system 304, and an RDD output interface 306. The RDD input interface 302 provides connectivity to the above-described connector 124 (and connectors 126 if used). The RDD output interface 306 provides connectivity to the above-described connector 128 such that the processed radar information is communicated to the EFB processing system 120 (or directly to the display 122). The RDD processing system 304, which processes the received radar information into a format used by the EFB processing system 120 (or the display 122), is described in greater detail hereinbelow.

Figures 4, 5, 6:
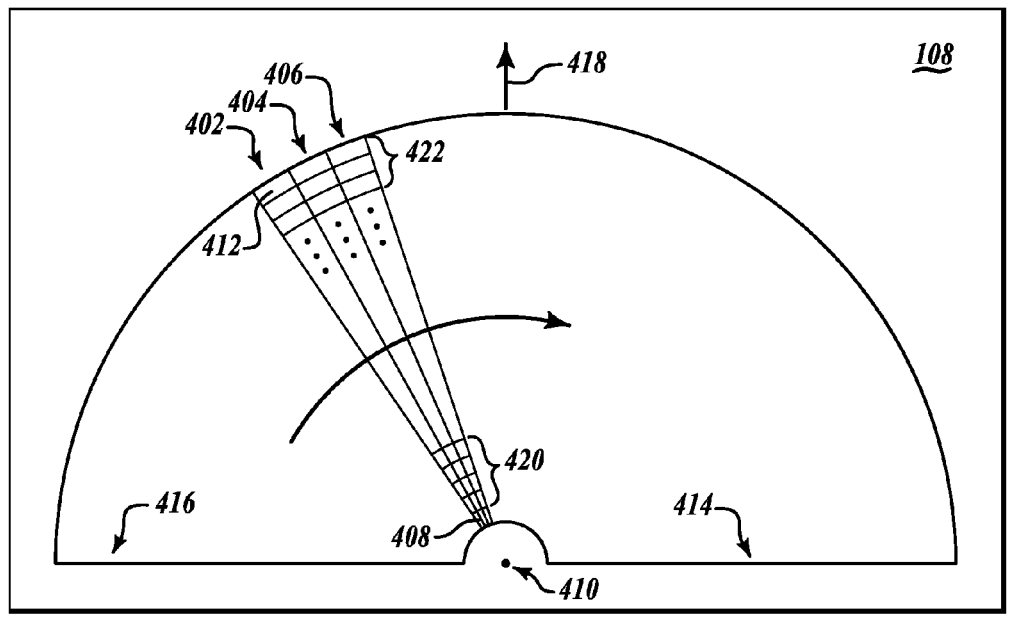
FIG. 4 is a conceptual illustration of information corresponding to three radials of ARINC 453 data presented on a radar display.
FIG. 5 is a conceptual illustration of radar information generated under the ARINC 453 format.
FIG. 6 conceptually illustrates processed information prepared by an exemplary embodiment of the radar data compression unit.

FIG. 4 is a conceptual illustration of radar information corresponding to three radials 402, 404, and 406 of ARINC 453 data presented on the radar display 108 (FIG. 1). As noted above, radar information is processed into a series of color information assigned to bins of a radial. The display 108 is activated so that the radials are presented in a serial manner moving across the display 108. Thus, the viewer perceives a sweeping-like presentation of the radar information as the radials are serially presented.

For example, as radial 402 is presented, a first bin 408 with a first color is visible at or near the origin 410. Colors are presented out along the radial up to the last bin 412 with a last color. As noted above, colors are indicative of the nature (e.g., severity) of the detected weather phenomena and/or other physical objects. For example, the color black indicates an absence of weather phenomena (no returning reflected radar signal at that range). Other colors used are red, orange, yellow, green, blue and magenta. The colors presented in a radar image normally range from blue or green for weak returns, to red or magenta for very strong returns. Strong returns (red or magenta) may be indicative of heavy rain, thunderstorms, hail, strong winds, or tornadoes, however such information needs to be interpreted carefully.

Following presentation of the first radial 402, a next radial 404 is next presented, followed by another radial 406. Presentation of the radials continues until the last radial is presented at the right side 414 of the radar display 108. Then, in an exemplary embodiment, the radials are refreshed in the reverse direction across the radar display 108, beginning at the right side 414 and continuing to the left side 416. Since the currently presented radial corresponds to a more recent acquisition of radar data than the preceding presented radials, the radar display 108 is refreshed with the most currently available radar information. Other embodiments may refresh the presented radials in other suitable manners.

Further, since the location of a bin along any particular radial corresponds to proximity to the detecting radar system 104, the viewer understands that the presented information corresponding to the group of bins 420 corresponds to the detection of reflecting weather phenomena (and/or other physical objects) relatively close to detecting radar system 104, and that the last of the bins 422 corresponds to the detection of reflecting weather phenomena (and/or other physical objects) relatively far away from the detecting radar system 104.

It is appreciated that the illustrated radar display 108 displays across a range of approximately 180°, with the arrow 418 corresponding to the front of the airplane in which the radar display 108 is installed. Other radar information presentation formats may be used, such as a 360° presentation wherein radar information surrounding the detecting radar system is displayed. Embodiments of the radar information presentation system 100 may be operable with any suitable radar device or system.

FIG. 5 is a conceptual illustration of the radar information 502 generated under the ARINC 453 format. Each radial i resides in a 1600 bit word that begins with a 64 bit header (Pi) followed by a series of 512 sub-words (3 bits each). The header (Pi) contains various presentation information pertaining to the radial, such as the angular orientation of the header on the radar display 108. For example, the header (Pi) may contain a specified angle at which the corresponding radial is to be presented on the radar display 108.

In the simplified example of FIG. 5, the location of the 3 bit sub-words in the word corresponds to the location along the radial i. For example, the first sub-word (indicated as "1") contains the information that corresponds to presented first bin 408 (FIG. 4). The sub-words indicated as "1", "2", "3", and "4" in FIG. 5 correspond to the first four presented bins 420 (FIG. 4). The last sub-word 512 corresponds to the last presented bin 412 (FIG. 4).

Further, the 3 bit sub-words contain color information corresponding to the characteristics of detected reflecting weather phenomena (and/or other physical objects). For example, a number in a bin may correspond to the color black to indicate that for that range bin, no reflections from weather phenomena (and/or other physical objects) were detected.

It is appreciated that other suitable radar information formats may be received and processed by various embodiments of the radar information presentation system 100. A different number of range bins may be used, for example. Further, additional or alternative colors may be used. Some radar systems 104 may use only black and white colors.

FIG. 6 conceptually illustrates processed radar information 602 prepared by an exemplary embodiment of the RDC unit 110. The RDC unit 110 receives the radar information from the radar system 104. In embodiments where the connection 124 (and connections 126 if present) communicates data under the ARINC 429 format, the RDC unit 110 processes the received ARINC 453 radar data into 32 bit words compatible with the ARINC 429 format. Other embodiments process the received radar information into a format appropriate for the connection 124 (and connections 126 if present).

The RDD unit 118 receives the processed radar information 602. Then, the processed radar information 602 may be decompressed (further processed) for communication to the EFB processing system 120. The EFB processing system 120 then processes the received radar information into a format that is communicated to the display 122. For example, if the display 122 is an ARINC 453 compliant display, then the RDD unit 118 and/or the EFB processing system 120 processes the received processed radar information 602 back into the ARINC 453 data format. The processing may be performed by the RDD unit 118 such that the ARINC 453 compliant radar information is communicated to the EFB processing system 120. Or, partial decompression may be performed by the RDD unit 118 such that the radar information is communicated to the EFB processing system 120, which then finishes the processing so that the ARINC 453 compliant radar information is communicated to the display 122. In embodiments where the RDC unit 110 decompresses the received radar information 602 into the ARINC 453 format, the radar information may be communicated directly to display 122 (via connection 130) or may be communicated onto connection 134 (via connection 132).

In some embodiments, the display 122 may not be ARINC 453 compliant. For example, the display 122 may require vectorized, rasterized, or pixel-based image data. For example, the display 122 may be a pixel-based flat screen display. Or, the display 122 may be a cathode ray tube (CRT) display that scans one or more electron beams from left to right, and from top to bottom, across its display screen. Accordingly, such data may be further processed by either the RDD unit 118 or the EFB processing system 120 into display information that is receivable by the display 122.

Various information compression and decompression techniques, interchangeably referred to as information processing techniques, used by embodiments of the radar information presentation system 100 are now described. The various embodiments may use one of, or a combination of, the information processing techniques described herein. The information processing techniques include run length encoding, elimination of redundant range cell data, conversion for polar to Cartesian coordinates, optimization of information based upon the display resolution, and/or use of multiple communication channels (between the RDC unit 110 and the RDD unit 118). The information processing techniques, alone or in combination, process the data intensive information generated by the radar system 104 (for example, ARINC 453 compliant radar information) into a less data intensive format (for example, ARINC 429 compliant radar information) for communication to the EFB 116.

Run-length encoding (RLE) is a form of information compression in which sequences of the same data value (consecutive data elements) are stored as a single data value and count, rather than as the original run of sequential like data elements. Common formats for RLE data includes, but is not limited to, PackBits, Pacific Exchange (PCX), or interchange file format (ILBM). RLE data may be processed using various techniques, such as Modified Huffman coding. Embodiments of the radar information presentation system 100 may employ any suitable RLE technique.

For example, returning to FIGS. 5 and 6, the data for radial i in the first four bins (1-4) may have black color information therein (corresponding to an absence of reflected weather phenomena and/or other physical objects). The RDC unit 110 may process the information to indicate that these four bins are colored black, and place the information in the first bin "A" of the radar information 602. The processed radar information 602 is then communicated to the RDD unit 118 via the low bandwidth connector 124 (or connections 126 if present). If necessary, the RDD unit 118 may apply a reverse RLE process to decompress the radar information 602 back to its original format.

Another processing technique is to eliminate redundant range cell data. Under the ARINC 453 radar data standard used by many legacy radar systems 104, data bin pairs contain the same information. For example, the first bin ("1") and the second bin ("2") of an ARINC 453 data word 502 are the same. The third bin ("3") and the fourth bin ("4") of an ARINC 453 data word 502 are the same.

Embodiments of the RDC unit 110 combine, eliminate or otherwise process the bin pairs (values) into a single bin (value). For example, if the same value of the information of the first bin ("1") and the second bin ("2") of data word of the radar information 502 corresponds to the color black, then the information in bin "A" of the radar information 602 will indicate the color black. Similarly, the third bin ("3") and the fourth bin ("4") of the ARINC 453 data word can be processed into a single bin "B". Accordingly, the amount of data in an ARINC 453 data word of radar information 502 can be reduced into a processed word of radar information 602 that is one half the size of the original ARINC 453 data word. That is, the radar data of a first bin and duplicate radar data of an adjacent second bin is processed into a single bin by the RDC unit 110 which processes the received ARINC 453 radar data by eliminating redundant range cell data.

When the single bin of radar information is received by the RDD unit 118, assuming that the radar information 602 is to be processed back into the ARINC 453 radar data format, the received radar information 602 will be reprocessed back into two bins such that the first bin ("1") and the second bin ("2") of an ARINC 453 data word indicates the color black.

Another processing technique is to process the ARINC 453 compliant radar information from polar coordinates to Cartesian coordinates. For example, the first bin ("1") and the second bin ("2") of a ARINC 453 data word for two or three adjacent radials may correspond to a single bit of the display 122. As illustrated in FIG. 4, that portion of the display 108 is relatively small such that the above-described sub-words may ultimately correspond to a very small area on the display 122. When the polar coordinate-based data is presented as a series of radials on the display 122, the same display pixel will be overwritten as data for each radial is presented.

Rather than converting the polar coordinate-based ARINC 453 radar information 502, some embodiments of the RDC unit 110 processes the received radar information 502 (a series of polar coordinate-based radials) into Cartesian coordinate information with a predefined granularity (pixel size), such that a single data point is determined (which corresponds to a plurality of radial bins of the ARINC 453 compliant radar information). Accordingly, if several bins of adjacent ARINC 453 radar data radials correspond to a single pixel on display 122, then conversion of the ARINC 453 radar data into polar coordinates decreases the amount of data that is communicated. For example, but not limited to, at least one bin of a first radial of the ARINC 453 radar data and an adjacent bin of an adjacent radial of the ARINC 453 radar data is processed into a combined bin (value). That is, high resolution data is processed into low resolution data corresponding to a native resolution of a remote display.

In some embodiments, the RDC unit 110 processes the ARINC 453 radar information 502 based upon the resolution of the display 122. That is, the granularity of the predefined pixel size of the display 122 may be used to determine the amount of information reduction when the ARINC 453 radar information 502 is converted into Cartesian coordinate-based radar information 602. For example, the native display resolution of the display 122 may be 640×480. However, the ARINC 453 radar information 502 provides a higher degree of resolution, particularly near origin 410 (see display 108, FIG. 4). Accordingly, the amount of information to be communicated from the RDC unit 110 to the RDD unit 118 may be reduced by processing the ARINC 453 radar information 502 into information that corresponds to the display resolution of the display 122 which will be presenting the processed radar information.

In some embodiments, the radar information presentation system 100 may be operable to present information on different displays 122. For example, one EFB 116 may have a display 122 with a first display resolution, and a different EFB 116 may have a different type of display 122 with a second display resolution. The radar information presentation system 100 compresses the received ARINC 453 radar information 502 into variable sized pixel data that corresponds to the actual display resolution of the display 122. In one embodiment, the RDD unit 118 may detect the display resolution of the display 122, or may have the display resolution information stored therein. When the RDD unit 118 is coupled to the RDC unit 110 via the connection 124 (and the connections 126 if used), the RDD unit 118 may communicate the native display resolution of display 122 to the RDC unit 110. The RDC unit 110 may then adjust its processing of the ARINC 453 compliant radar information received from radar system 104.

Another processing technique is to process the ARINC 453 radar information 502 into a plurality of sub channels that are individually communicated between the RDC unit 110 and the RDD unit 118 over dedicated connectors. For example, a second connector 126 may communicatively couple the RDC unit 110 and the RDD unit 118. Accordingly, both connectors 124 and 126 may be used to transfer different portions of the radar information 502. Some embodiments of the radar information presentation system 100 may have a plurality of connectors 126, thereby providing a higher net transfer capacity between the RDC unit 110 and the RDD unit 118.

Figure 7:
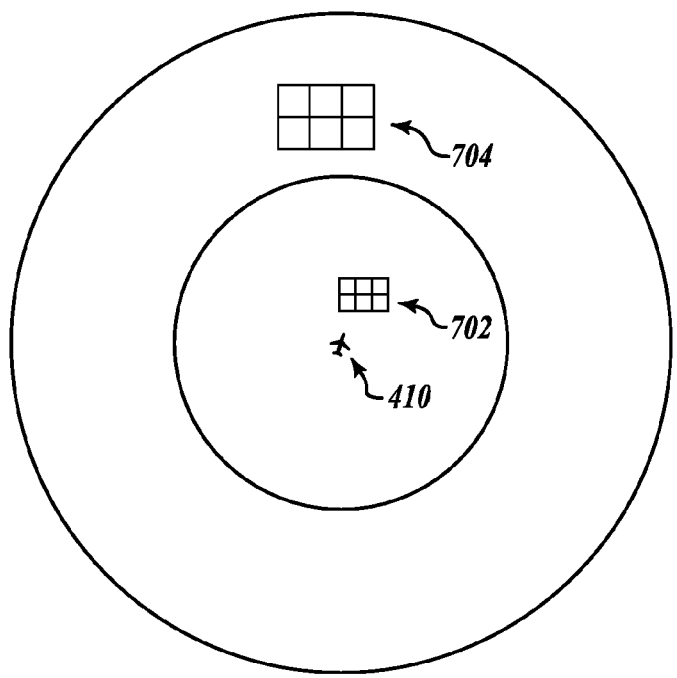
FIG. 7 is a conceptual illustration of data granularity of a first and a second region of data in the ARINC 453 format.
Figure 8:
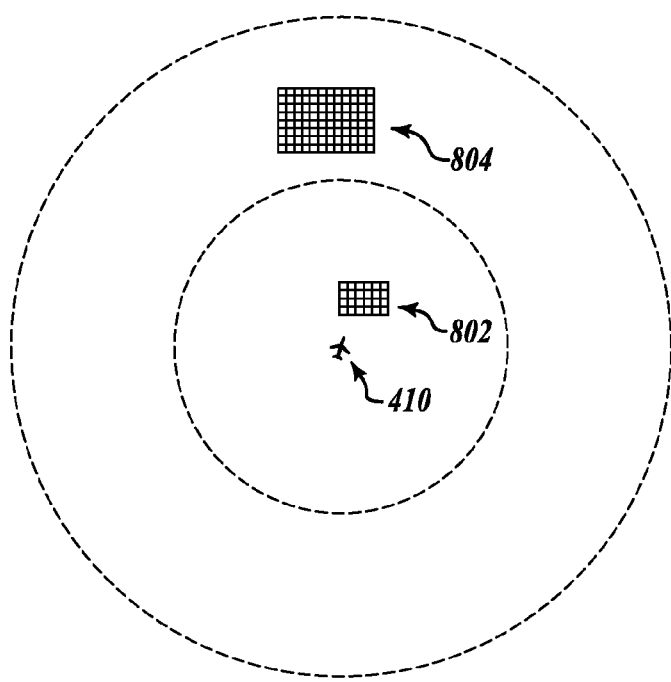
FIG. 8 is a conceptual illustration of the pixel data resolution on an EFB display for the first and the second regions of FIG. 6.

FIG. 7 is a conceptual illustration of data granularity of a first and a second region 702, 704 of data in the ARINC 453 format. Here, the granularity of the ARINC 453 compliant radar information is much finer near the origin 410. In contrast, FIG. 8 is a conceptual illustration of the pixel data resolution on the EFB display 122 for the first region 702 and the second region 704 of FIG. 7. Here, the resolution of the display 122 is finer for both the region 802 (corresponding to the above-described region 702) and the region 802 (corresponding to the above-described region 704). However, the resolution of the radar information as presented is not as fine as the native resolution of the display 122. That is, even if the radar information was provided based on the native resolution of the display 122, such presented radar information with the maximum degree of granularity would not be discernable by the viewer. Or, if discernable, the higher degree of granularity of the presented radar information may provide no significant benefit. That is, a lower resolution presentation of the radar information may be adequate for the viewer's particular needs. Accordingly, embodiments of the radar information presentation system 100 may process the ARINC 453 radar information 502 received from radar system 104 to a predefined threshold of granularity that is sufficient to meet the needs of the viewer of display 122. For example, a resolution corresponding to one of the pixels of region 704 may be adequate to meet the viewer's needs. Accordingly, four pixels of region 702 may be combined into a single data pixel. When the radar information is presented on display 122, the larger pixel data is displayed. That is, many of the smaller pixels of display 122 simply display the same data. Accordingly, less radar information needs to be communicated from the RDC unit 110 to the RDD unit 118.

As noted above, embodiments of the radar information presentation system 100 may use a plurality of the above-described processing techniques to process the high bandwidth radar information 502 received from the radar system 104 into a lower bandwidth radar information 602 that may be communicated from the RDC unit 110 to the RDD unit 118 via connection 124 (and connections 126 if used). For example, but not limited to, received ARINC 453 compliant radar information may be processed by conversion from polar to Cartesian coordinates, and then further processed to correspond to the native resolution of the display 122.

In some embodiments, the connection 124 (and connections 126 if used) may be coupleable to either the RDC unit 110 and/or the RDD unit 118. For example, connectable ports may be available on the RDC unit 110 and/or the RDD unit 118 such that the user may attach the connection 124 (and connections 126 if used) when the EFB 116 is brought into the cockpit of an airplane. Here, the RDC unit 110 may be already attached to, or integrated into, the radar system 104.

In such embodiments, a single RDD unit 118 may be configured to communicate the compressed radar information 502 to a variety of different types of RDC units 110. The receiving RDD units 118 may be different to facilitate transfer of processed radar information to different types of EFB processing systems 120 and/or different types of displays 122. Accordingly, the RDC unit 110 is operable to detect characteristics of the RDD unit 118 to which it is coupled such that one or more appropriate information processing techniques are selected.

In some embodiments, the RDC unit 110 may be coupleable to a variety of different types of EFB processing systems 120 and/or displays 122. Accordingly, the RDC unit 110 is operable to detect the characteristics of the different types of EFB processing systems 120 and/or different types of displays 122 to which it is coupled such that a selection of processing techniques are selected.

In some embodiments, the RDD unit 118 and the RDC unit 110 may be integrated as a single processing system or device. Thus, the integrated converter device couples to a suitable data port or data connector in the aircraft to receive the radar information 602 generated under the ARINC 453 format. The integrated converter device would also be coupleable to a suitable data port or data connector in the EFB 116, such as a port or connector configured under the ARINC 429 format.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiment of the invention in which an exclusive property or privilege is claimed are defined as follows:

1. A method for communicating radar information, comprising:
receiving radar information from an aircraft radar system, the radar information communicated from the aircraft radar system in an ARINC 453 format to a remote radar data compression (RDC) unit coupled to the aircraft radar system;
processing the received ARINC 453 radar information into processed radar information at the RDC unit, the processed radar information configured for communication over a connection operable at a low bandwidth, the low bandwidth lower than a bandwidth of the ARINC 453 radar information;
communicating the processed radar information at the low bandwidth from the RDC unit over the connection to a radar data decompression (RDD) unit; and
processing the processed radar information at the RDD unit for presentation on an electronic flight bag (EFB) display.

2. The method of claim 1, wherein processing the received radar information comprises processing the ARINC 453 radar information by processing radar information of a first bin and duplicate radar information of an adjacent second bin into a single bin.

3. The method of claim 1, wherein processing the received radar information comprises processing at least one bin of a first radial of the ARINC 453 radar information and an adjacent bin of an adjacent radial of the ARINC 453 radar information into a combined bin.

4. The method of claim 1, wherein processing the received radar information comprises processing the received radar information from a polar coordinate system to a Cartesian coordinate system.

5. The method of claim 1, wherein processing the received radar information comprises processing the received radar information from a first resolution to a second resolution.

6. The method of claim 1, wherein communicating the processed radar information over the connection comprises:
communicating a first portion of the processed radar information at the low bandwidth over a first connection; and
communicating a second portion of the processed radar information at the low bandwidth over a second connection.

7. The method of claim 1, wherein the connection communicates the processed radar information under an ARINC 429 format.

8. The method of claim 1, wherein the connection communicates the processed radar information under an RS 422 format.

9. The method of claim 1, further comprising:
receiving the processed radar information;
processing the received processed radar information into display information; and
communicating the display information to the EFB display.

10. The method of claim 1, further comprising:
receiving the processed radar information;
processing the received processed radar information into ARINC 453 radar information; and
communicating the ARINC 453 radar information to the EFB display.

11. An aircraft radar information processing system, comprising:
a radar data compression (RDC) unit coupled to an aircraft radar system, operable to receive radar information from the aircraft radar system communicated at a first bandwidth, and operable to process the received radar information into processed aircraft radar information corresponding to a second bandwidth, the second bandwidth lower than the first bandwidth;

a connector coupled to the RDC unit and operable to communicate the processed radar information at the second bandwidth; and a radar data decompression (RDD) unit coupled to the connector, operable to receive the processed aircraft radar information communicated at the second bandwidth, and operable to process the received processed aircraft radar information into displayable radar information that is presentable on a display of an electronic flight bag (EFB).

12. The radar information processing system of claim 11, further comprising:

an EFB processing system coupled to the RDD unit, operable to receive the displayable radar information, and further operable to process the presentable radar information into a display signal receivable by the display.

13. The radar information processing system of claim 11, wherein the display is coupled to the RDD unit and is operable to receive the presentable radar information.

14. The radar information processing system of claim 11, wherein the radar information received from the radar system is formatted in an ARINC 453 format, and wherein the received radar information is formatted in an ARINC 429 format.

15. The radar information processing system of claim 11, wherein the connector is an ARINC 429 connector.

16. The radar information processing system claim 11, wherein the RDC unit processes the received radar information using run length encoding to generate the processed radar information.

17. The radar information processing system claim 11, wherein the radar information received from the radar system is formatted in an ARINC 453 format, and wherein the RDC unit processes the received ARINC 453 radar information by eliminating redundant range cell data.

18. The radar information processing system claim 11, wherein the radar information received from the radar system is formatted in an ARINC 453 format, and wherein the RDC unit processes the received radar information by converting the ARINC 453 radar information from a polar coordinate system to a Cartesian coordinate system.

19. The radar information processing system claim 11, wherein the connector is a first connector that is operable to communicate a first portion of the processed radar information at the second bandwidth to the EFB, and further comprising:

a second connector coupled to the RDC unit and operable to communicate a second portion of the processed radar information at the second bandwidth to the EFB.

* * * * *

UNITED STATES PATENT AND TRADEMARK OFFICE
CERTIFICATE OF CORRECTION

| | | |
|---|---|---|
| PATENT NO. | : 8,599,064 B2 | Page 1 of 1 |
| APPLICATION NO. | : 12/040706 | |
| DATED | : December 3, 2013 | |
| INVENTOR(S) | : Bunch et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1034 days.

Signed and Sealed this
Fourteenth Day of April, 2015

Michelle K. Lee
*Director of the United States Patent and Trademark Office*